(12) United States Patent
Sawada

(10) Patent No.: US 7,780,227 B2
(45) Date of Patent: Aug. 24, 2010

(54) FUNCTIONAL PART HOLDING STRUCTURE

(75) Inventor: Kazuki Sawada, Handa (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 8 days.

(21) Appl. No.: 12/379,995

(22) Filed: Mar. 5, 2009

(65) Prior Publication Data
US 2009/0224573 A1     Sep. 10, 2009

(30) Foreign Application Priority Data
Mar. 6, 2008     (JP)     .............................. 2008-056590

(51) Int. Cl.
*B60J 7/00*     (2006.01)
(52) U.S. Cl. ................................. 296/216.08
(58) Field of Classification Search ........................ 296/216.06–216.08; 16/87 R–107
See application file for complete search history.

(56) References Cited

U.S. PATENT DOCUMENTS 7,073,851 B2 *     7/2006     Seifert ................... 296/216.08

2008/0191519 A1     8/2008     Sawada et al.

FOREIGN PATENT DOCUMENTS

JP     2005-162063     6/2005

* cited by examiner

*Primary Examiner*—Dennis H Pedder
(74) *Attorney, Agent, or Firm*—Finnegan, Henderson, Farabow, Garrett & Dunner, LLP

(57) ABSTRACT

A functional part holding structure adapted to guide a functional part supporting a movable panel to a guide rail, the functional part holding structure includes a first member including a bottom wall, a second member including a cover wall, first and second side walls extending from one of the bottom wall and the cover wall in the width direction toward the other one of the bottom wall and the cover wall, the ends of the first and second side walls making contact with the other one of the bottom wall and the cover wall, and first and second guide grooves formed by the bottom wall, the cover wall, and the first and second side walls and into which guide portions are disposed respectively, the guide portions being formed at both ends of the functional part in the width direction, the guide portions moving upward and downward along the first and second guide grooves and guided to the guide rail.

6 Claims, 4 Drawing Sheets

FUNCTIONAL PART HOLDING STRUCTURE

CROSS REFERENCE TO RELATED APPLICATIONS

This application is based on and claims priority under 35 U.S.C. §119 to Japanese Patent Application No. 2008-056590, filed on Mar. 6, 2008, the entire content of which is incorporated herein by reference.

FIELD OF THE INVENTION

This invention generally relates to a functional part holding structure. More particularly, this invention pertains to a functional part holding structure for guiding a functional part that supports a movable panel to a guide rail.

BACKGROUND

A known functional part holding structure for guiding a functional part that supports a movable panel to a guide rail is disclosed in JP2005-162063A, for example. According to the functional part holding structure disclosed, a functional part includes guide portions formed at both ends in a width direction so as to extend outwardly. The guide portions are disposed into a pair of guide grooves formed at a guide block to thereby position the guide portions in a width direction and height direction. The guide portions move upwards towards the rear of the vehicle so as to be guided to a guide rail.

According to the aforementioned functional part holding structure, a portion defined between both of the guide grooves opens upward over an entire length thereof, thereby preventing a sufficient rigidity of the structure. Further, the guide grooves are separately and individually formed by dies divided in the width direction, for example, thereby deteriorating a dimensional accuracy (i.e., pitch accuracy) in the width direction of the structure.

A need thus exists for a functional part holding structure which is not susceptible to the drawback mentioned above.

SUMMARY OF THE INVENTION

According to an aspect of the present invention, a functional part holding structure adapted to guide a functional part to a guide rail, the functional part being provided at each side of a vehicle roof in a width direction thereof and supporting a movable panel, the functional part holding structure includes a first member including a bottom wall, a second member including a cover wall, first and second side walls extending from one of the bottom wall and the cover wall in the width direction toward the other one of the bottom wall and the cover wall, the ends of the first and second side walls making contact with the other one of the bottom wall and the cover wall, and first and second guide grooves formed by the bottom wall, the cover wall, and the first and second side walls and into which guide portions are disposed respectively in a manner where the guide portions are positioned in a width direction and a height direction within the first and second guide grooves, the guide portions being formed at both ends of the functional part in the width direction so as to extend outwardly, the guide portions moving upward and downward along the first and second guide grooves and guided to the guide rail.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
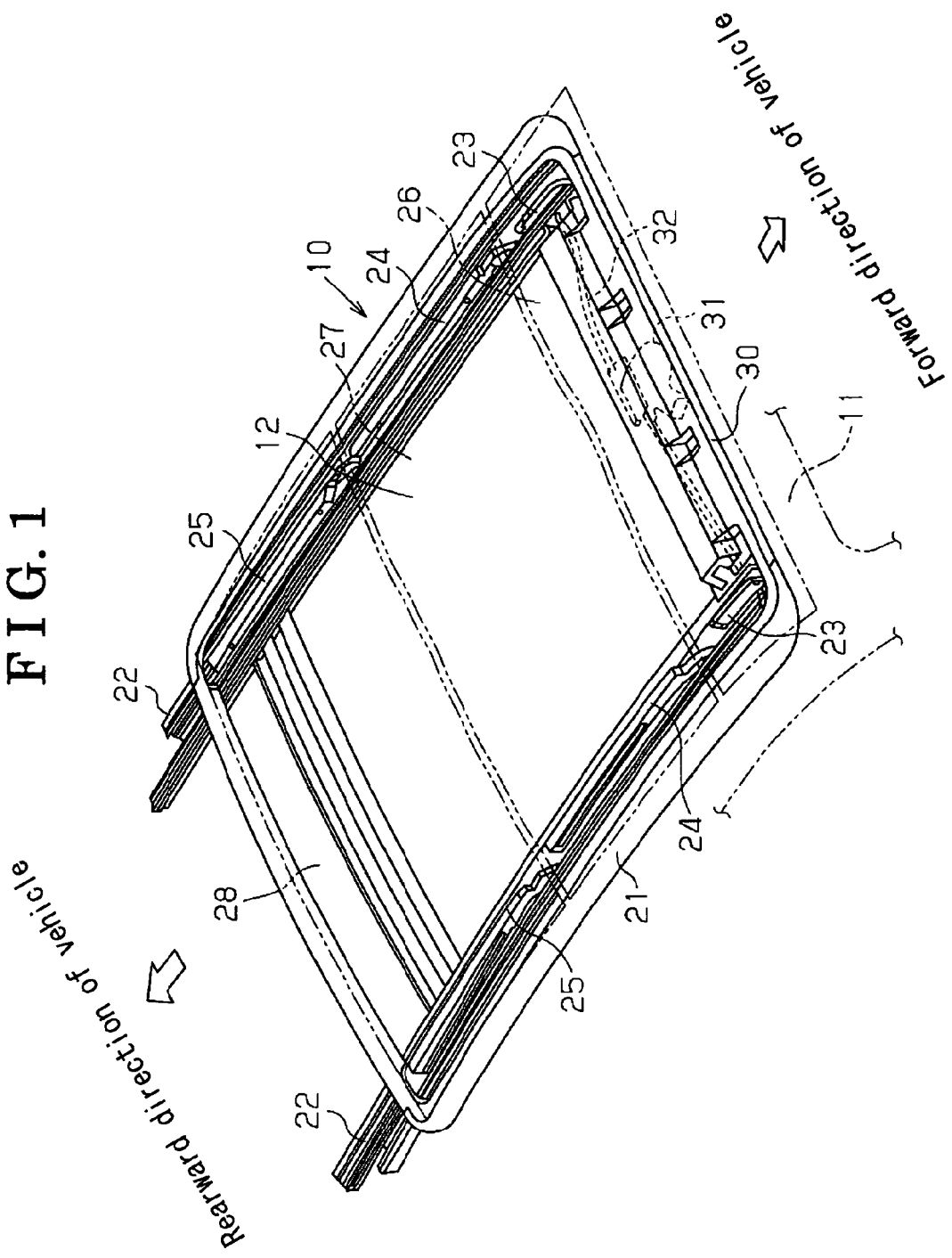
FIG. 1 is a perspective view illustrating a sunroof apparatus to which a functional part holding structure according to an embodiment of the present invention is applied.

An embodiment of the present invention will be explained with reference to the attached drawings. As illustrated in FIG. 1, a sunroof apparatus 10 is mounted onto a vehicle roof 11. The sunroof apparatus 10 includes a housing 21 and a pair of guide rails 22. The housing 21, having a rectangular frame shape, is tightened via a bolt to a peripheral edge of an opening portion 12 having a rectangular shape and formed at the vehicle roof 11. The guide rails 22 are attached to the housing 21 at both sides in a width direction of the vehicle (i.e., a width direction of the vehicle roof 11). Each of the guide rails 22 is made of an aluminum extrusion material, for example, and is provided to extend in a longitudinal direction of the vehicle (i.e., a longitudinal direction of the vehicle roof 11) while having a predetermined cross section in the longitudinal direction.

A first functional bracket 23, a second functional bracket 24, and a third functional bracket 25 are attached to each of the guide rails 22. More specifically, the first functional bracket 23 having an arm shape is attached to a front portion of the guide rail 22 in the longitudinal direction. The second functional bracket 24 serving as a functional part and having an arm shape is attached to the guide rail 22 so as to be positioned in the rear of the first functional bracket 23. The third functional bracket 25 having an arm shape is attached to the guide rail 22 so as to be positioned in the rear of the second functional bracket 24.

The first functional bracket 23 is configured so that a rear end portion moves up and down relative to a front end portion functioning as a rotational center (i.e., tilting operation). The second functional bracket 24 is configured so that a front end portion is raised to be guided to the guide rail 22 when the second functional bracket 24 moves to the rear of the vehicle. At this time, the second functional bracket 24 is tilted in such a way that a rear end portion is raised relative to the front end portion (i.e., tilting operation). The second functional bracket 24, of which front end portion is guided to the guide rail 22, is movable in the longitudinal direction of the vehicle while the rear end portion is being raised relative to the front end portion. The third functional bracket 25 is tilted in such a way that a rear end portion is raised relative to a front end portion when the third functional bracket 25 moves to the rear of the vehicle (i.e., tilting operation). Further, the third functional bracket 25 is movable in the longitudinal direction of the vehicle while the rear end portion is being raised relative to the front end portion.

A first movable panel 26, which is made of a glass plate, for example, is fixed and supported at both of the first functional brackets 23 attached to the guide rails 22, which are provided at both sides in the width direction of the vehicle. In the same way, a second movable panel 27 is fixed and supported at the second functional brackets 24 attached to the respective guide rails 22. Further, in the same way, a third movable panel 28 is fixed and supported at the third functional brackets 25 attached to the respective guide rails 22. The first to third movable panels 26 to 28 are arranged to close the entire opening portion 12 when front end portions of the first to third functional brackets 23 to 25 are each positioned at a front side of the vehicle (i.e., fully closed state). The first to third movable panels 26 to 28 collectively perform a so-called tilt-up operation by the first to third functional brackets 23 to 25 each conducting the tilting operation. Further, the second and third movable panels 27 and 28 collectively perform a slide operation by the second and third functional brackets 24 and 25 moving in the longitudinal direction of the vehicle.

The housing 21 includes a front housing 30 serving as a first member and a housing. The front housing 30 constitutes a front portion of the housing 21. A drive unit 31 is provided at an intermediate portion of the front housing 30 in the width direction of the vehicle. Drive cables 32 extend from the drive unit 31 towards the respective guide rails 22. Each of the drive cables 32 is connected to the second and third functional brackets 24 and 25 attached to each of the guide rails 22. The second and third movable panels 27 and 28 perform the tilt-up operation and the slide operation while the functional brackets 24 and 25 are pulled or pushed via the drive cables 32 driven by the drive unit 31. Respective front ends of the guide rails 22 provided at both sides in the width direction of the vehicle are fixed to the front housing 30 to thereby integrally connect the guide rails 22 to each other.

Figure 2:
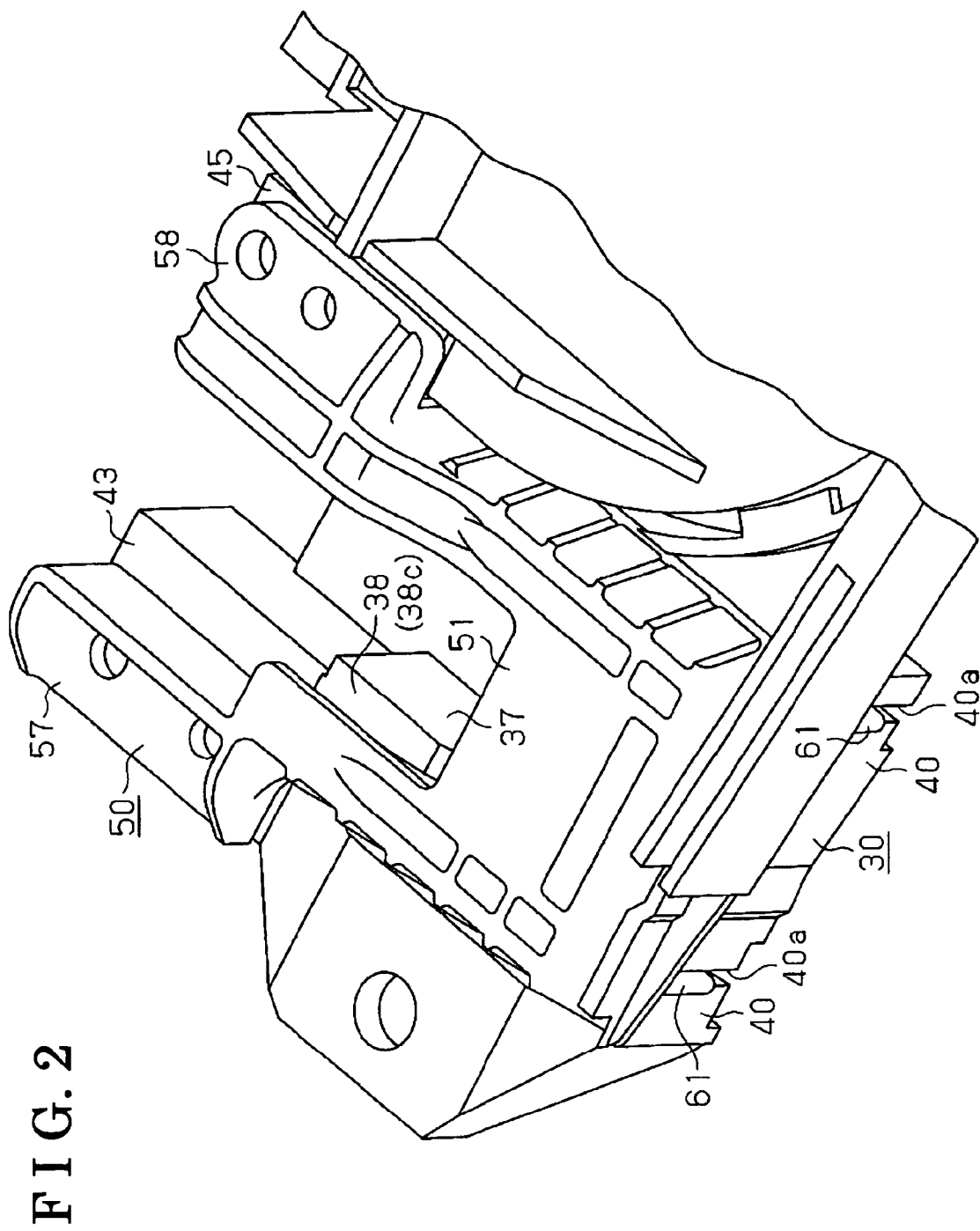
FIG. 2 is a perspective view illustrating the functional part holding structure according to the embodiment of the present invention.
Figure 3:
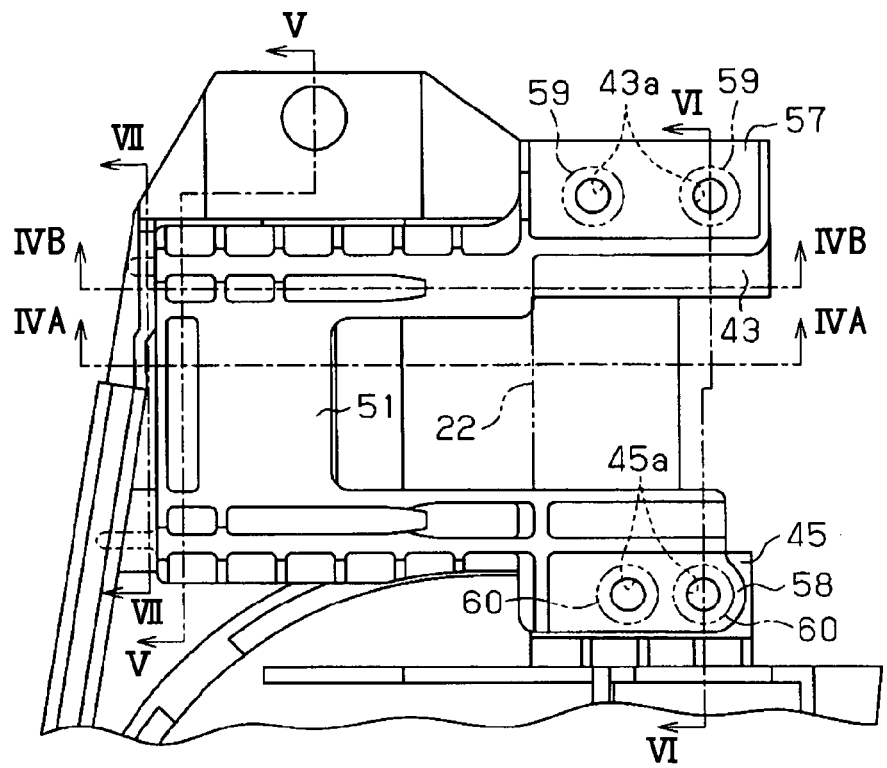
FIG. 3 is a plan view illustrating the functional part holding structure according to the embodiment of the present invention.
Figure 4A:
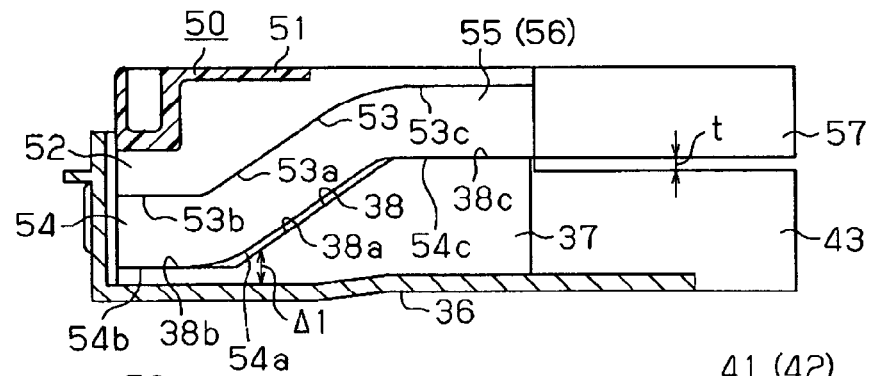
FIG. 4A is a cross-sectional view taken along the line IVA-IVA in FIG. 3.
Figure 4B:
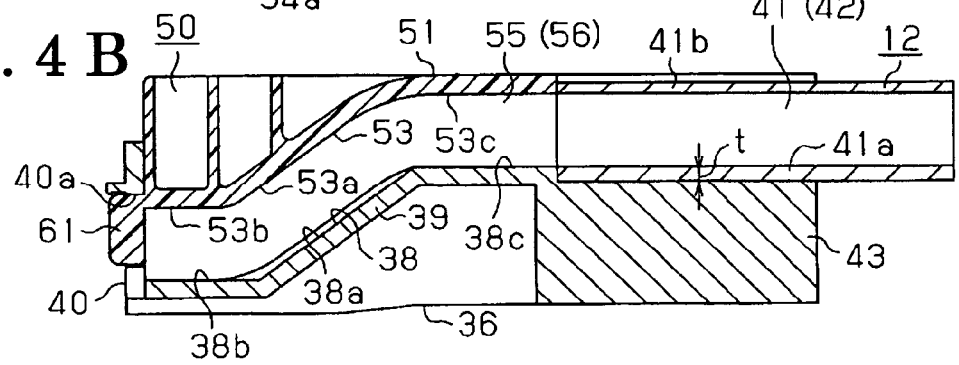
FIG. 4B is a cross-sectional view taken along the line IVB-IVB in FIG. 3.
Figure 5:
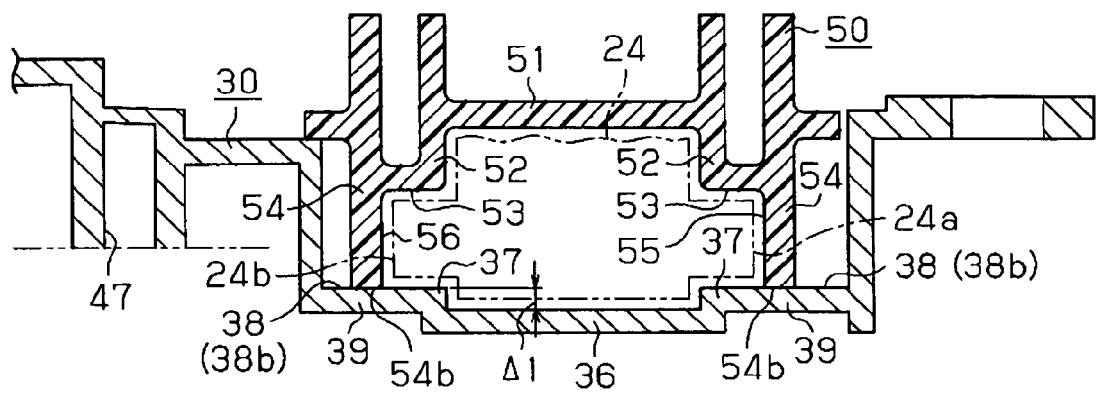
FIG. 5 is a cross-sectional view taken along the line V-V in FIG. 3.

A holding structure of a front end portion of each of the second functional brackets 24 will be explained below with reference to FIGS. 2 to 7. The front housing 30 is basically formed into a shape so as to be molded by a pair of dies relatively movable with respect to each other in a height direction of the front housing 30 (i.e., in a vertical direction of the vehicle). As illustrated in FIG. 5, an end portion of the front housing 30 in the width direction of the vehicle is formed into a substantially U-shape in the cross section upwardly opening and including a bottom wall 36 and a pair of first side walls 37. The first side walls 37 are formed to extend upwardly from respective ends of the bottom wall 36 in the width direction. Each of the first side walls 37 includes an upper surface 38, which is positioned one step ($\Delta 1$) higher than the bottom wall 36 and which extends in the width direction so as to be away from the bottom wall 36 to form a flange-shaped extension wall 39. Both of the extension walls 39 and the bottom wall 36 constitute a bottom surface of the front housing 30. As illustrated in FIGS. 4A and 4B, the upper surface 38 includes an inclined surface 38a at an intermediate portion in the longitudinal direction so that a height difference between the upper surface 38 and the bottom wall 36 is enlarged towards the rear of the vehicle, i.e., the upper surface 38 upwardly inclines towards the rear of the vehicle. The upper surface 38 further includes planes 38b and 38c horizontally extending forward and rearward in the longitudinal direction from front and rear ends of the inclined surface 38a, respectively.

Figure 7:
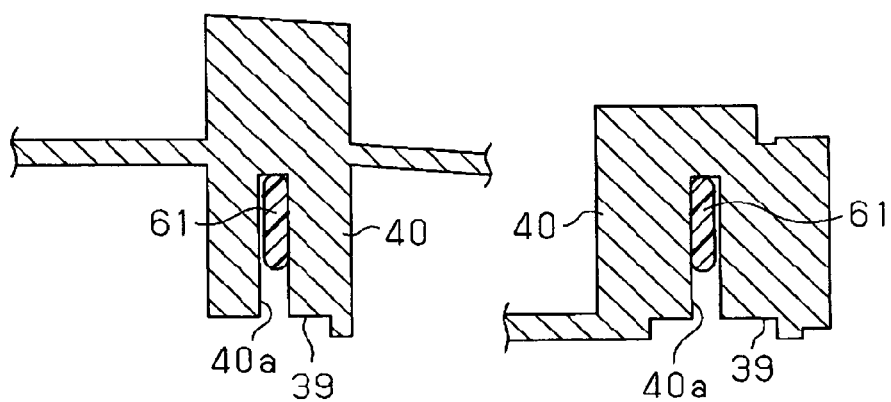
FIG. 7 is a cross-sectional view taken along the line VII-VII in FIG. 3.

As illustrated in FIG. 7, the extension walls 39 formed at both ends of the bottom wall 36 in the width direction are integrally connected to each other by means of vertical walls 40 upwardly extending from respective front ends of the extension walls 39. Each of the vertical walls 40 includes an engagement groove 40a serving as an engagement recess portion opening downwardly to be formed into a substantially U-shape. An upper side of each of the vertical walls 40 is closed by means of the engagement groove 40a. The vertical walls 40 (and the engagement grooves 40a) extend in the longitudinal direction of the vehicle.

Figure 6:
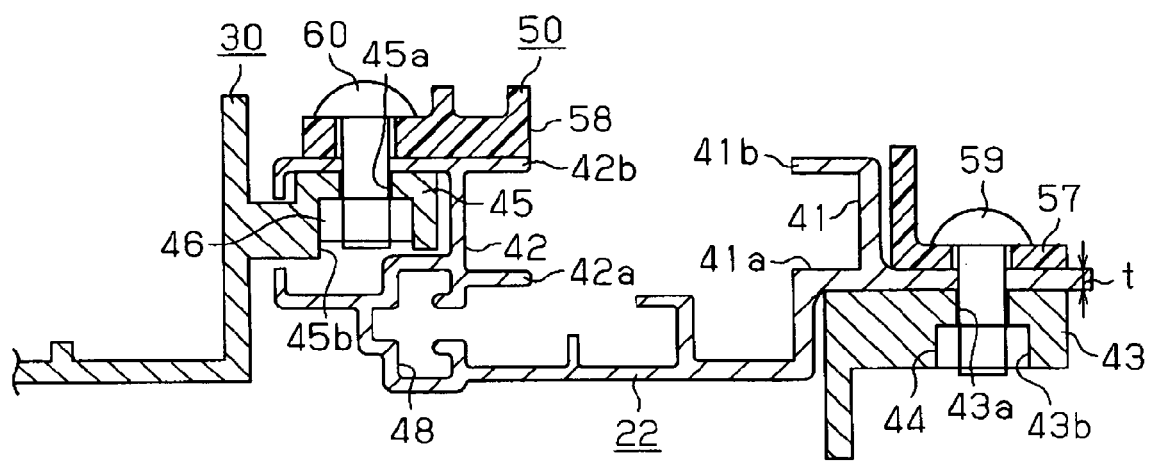
FIG. 6 is a cross-sectional view taken along the line VI-VI in FIG. 3.

As illustrated in FIG. 6, each of the guide rails 22 includes a pair of guide grooves 41 and 42 at inner and outer sides in the width direction of the vehicle. The guide grooves 41 and 42 each have a substantially U-shape in the cross section, of which openings face each other. The front housing 30 includes a support wall 43 in the rear of the plane 38c provided at the outer side in the width direction of the vehicle. The support wall 43 is lowered by a thickness t of a bottom wall portion 41a of the guide groove 41. Accordingly, the plane 38c is connected so as to be flush with an upper surface of the bottom wall portion 41a in the rear of the plane 38c. Two bolt insertion bores 43a are formed at the support wall 43 so as to penetrate in a height direction thereof and are arranged side by side in the longitudinal direction of the vehicle as illustrated in FIG. 3. A lower side of each of the bolt insertion bores 43a is expanded to form a receiving recess portion 43b. A nut 44 is press-fitted to and accommodated in the receiving recess portion 43b.

The front housing 30 includes a support wall 45, on which the guide rail 22 is placed, in the rear of the plane 38c provided at the inner side in the width direction so as to avoid a cross-sectional shape of the guide rail 22. The plane 38c is connected to be flush with an upper surface of a bottom wall portion 42a of the guide groove 42. Two bolt insertion bores 45a are formed at the support wall 45 so as to penetrate in a height direction thereof and are arranged side by side in the longitudinal direction of the vehicle as illustrated in FIG. 3. A lower side of each of the bolt insertion bores 45a is expanded to form a receiving recess portion 45b. A nut 46 is press-fitted to and accommodated in the receiving recess portion 45b.

As illustrated in FIG. 5, the front housing 30 includes a cable guide 47 adjacent to the extension wall 39 at the inner side in the width direction of the vehicle. The cable guide 47 is formed into a substantially U-shape opening downwardly. The cable guide 47 is closed because an opening end thereof is in contact with the vehicle roof 11. In addition, the cable guide 47 is connected to a cable guide portion 48 formed at the guide rail 22 (see FIG. 6). The drive cable 32 is inserted into the cable guide 47 and the cable guide portion 48 so that the movement of the drive cable 32 is guided.

As illustrated in FIG. 5, a block 50 serving as a second member is placed on the upper surfaces 38 of the first side walls 37. The block 50 is made of resin and formed into a protruding shape with a lower side being open. The block 50 is basically formed into a shape to be molded by a pair of dies relatively movable with respect to each other in a height direction of the block 50, i.e., in the vertical direction of the vehicle. The block 50 includes a cover wall 51 and a pair of second side walls 52 extending downwardly from both ends of the cover wall 51 in the width direction. Thus, the block 50 is formed into a substantially U-shape in the cross section, opening downwardly. The block 50 is expanded outwardly in the width direction by means of respective stepped portions 53 to form a pair of side walls 54. Both the stepped portions 53 and the cover wall 51 constitute a cover wall of the front housing 30. In addition, the block 50 is arranged in such a way to be in contact with the upper surfaces 38 of the first side walls 37 via lower surfaces of the side walls 54, respectively.

At this time, an extended line in a height direction (i.e., in the vertical direction of the vehicle) of an inner wall surface of each of the second side walls 52 is configured to match an inner wall surface of each of the first side walls 37.

As mentioned above, each of the upper surfaces 38 includes the inclined surface 38a at the intermediate portion in the longitudinal direction so as to upwardly incline towards the rear of the vehicle. As illustrated in FIGS. 4A and 4B, each of the stepped portions 53 facing the upper surfaces 38 in the height direction includes an inclined surface 53a at the intermediate portion in the longitudinal direction so as to upwardly incline towards the rear of the vehicle. The stepped portion 53 further includes planes 53b and 53c horizontally extending forward and rearward in the longitudinal direction from front and rear ends of the inclined surface 53a, respectively. Accordingly, a difference in height between the stepped portion 53 and the upper surface 38 is maintained constant. The planes 53c are connected so as to be flush with respective lower surfaces of cover walls 41b and 42b (see FIG. 6) of the guide grooves 41 and 42 arranged in the rear of the planes 53c. As illustrated in FIGS. 4A and 2, a rear end of the cover wall 51 is positioned in the vicinity of a boundary between the inclined surface 53a and the plane 53c in the longitudinal direction. Thus, a rear side of the cover wall 51 is open in a height direction thereof so as to avoid making contact with the second functional bracket 24.

In the same way, as illustrated in FIGS. 4A and 4B, each of the side walls 54 (specifically, a lower end surface thereof) includes an inclined surface 54a at the intermediate portion in the longitudinal direction so as to upwardly incline towards the rear of the vehicle. The side wall 54 further includes planes 54b and 54c horizontally extending forward and rearward in the longitudinal direction from front and rear ends of the inclined surface 54a, respectively. Accordingly, the side wall 54 is positioned onto the upper surface 38 without hitting the upper surface 38 in the height direction. The side wall 54 is in contact with the upper surface 38 (specifically, planes 38b and 38c) via the planes 54b and 54c.

According to the aforementioned structure, the upper surfaces 38 and an inner wall surface of the block 50 (specifically, the stepped portions 53 and the side walls 54) form a pair of guide grooves 55 and 56 at inner and outer sides in the width direction of the vehicle. The guide grooves 55 and 56 face each other and open towards each other. Each of the guide grooves 55 and 56 has a substantially U-shape as illustrated in FIG. 5. The guide grooves 55 and 56 are each constituted by two parts, i.e., the front housing 30 and the block 50 that are divided in the height direction. In particular, respective front portions of the guide grooves 55 and 56 in the longitudinal direction have closed cross sections by means of the cover wall 51. As illustrated in FIGS. 4A and 4B, the guide grooves 55 and 56 incline upwards at the intermediate portion in the vehicle longitudinal direction towards the rear of the vehicle. The cross sections of the guide grooves 55 and 56 match the cross sections of the guide grooves 41 and 42, respectively, as illustrated in FIGS. 5 and 6. Respective rear ends of the guide grooves 55 and 56 are continuously connected to the respective front ends of the guide grooves 41 and 42 in the longitudinal direction of the vehicle.

As illustrated in FIG. 5, the second functional bracket 24 includes guide portions 24a and 24b at front ends. The guide portions 24a and 24b are formed at both ends in the width direction of the vehicle so as to extend outwardly and are each formed into a column shape. Further, the guide portions 24a and 24b are disposed into the guide grooves 55 and 56, respectively, to thereby position the guide portions 24a and 24b in the width direction and the height direction within the guide grooves 55 and 56. Accordingly, the guide portions 24a and 24b move upward along the guide grooves 55 and 56 and are guided to the guide rail 22 (guide grooves 41 and 42) when the second functional bracket 24 moves rearward.

As illustrated in FIGS. 2 and 6, the block 50 includes flange-shaped attachment pieces 57 and 58 arranged at upper sides of the support walls 43 and 45, respectively. The block 50 and the front housing 30 are connected to each other by means of threaded portions of bolts 59 and 60 tightened to the nuts 44 and 46, respectively. More specifically, the bolts 59 and 60 penetrate through the block 50, the front housing 30, and the guide rail 22 that is disposed between the support walls 43 and 45, and the attachment pieces 57 and 58. That is, the block 50 and the front housing 30 are fastened and tightened together with the guide rail 22.

Further, the first member 30 includes an engagement recess portion 40a of which an upper side is closed and which extends in the longitudinal direction of the vehicle roof 11, and the second member 50 includes an engagement projection 61 engaging with the engagement recess portion 40a and formed to extend in the longitudinal direction of the vehicle roof 11. In the embodiment illustrated in FIGS. 2 and 7, each of the side walls 54 includes an engagement projection 61 extending in the longitudinal direction of the vehicle and facing each of the engagement grooves 40a. The position of the block 50 in the width direction is determined by means of the engagement projections 61 engaging with the respective engagement grooves 40a. In addition, the upward movement of the block 50 is also restricted by means of the engagement projections 61 engaging with the respective engagement grooves 40a. Accordingly, the block 50 is prevented from disengaging from the front housing 30 in the height direction.

According to the aforementioned embodiment, the following effects are obtained. First, as explained above, the block 50 is substantially U-shaped in the cross section opening downwardly in such a way that the side walls 54, which form a part of the guide grooves 55 and 56, are connected to each other via the stepped portions 53 and the cover wall 51, thereby increasing a rigidity of the block 50. Then, the guide portions 24a and 24b of the second functional bracket 24 are guided in an up and down manner to the guide rail 22 in a state where the guide portions 24a and 24b are securely positioned in the height direction. In addition, because a shape defined by the guide grooves 55 and 56 in the width direction is achieved by one part (i.e., the block 50 including the side walls 54), a dimensional accuracy in the width direction (i.e., pitch accuracy) is easily secured. The guide grooves 55 and 56, and the guide rail 22 (guide grooves 41 and 42) are connected to each other without having a step therebetween. The guide portions 24a and 24b of the second functional bracket 24 are smoothly guided to the guide rail 22 accordingly.

Further, front end portions of the block 50 and the front housing 30 facing the block 50 each have the substantially U-shape in the cross section. Therefore, in each molding process of the block 50 and the front housing 30, it is basically only required that a pair of dies is relatively moved in a direction where each of the block 50 and the front housing 30 is opening (i.e., height direction). Therefore, slide-type dies moved in a cross direction thereof, which are required for molding a guide groove in a known molding process, are not necessary, thereby enhancing easy production of dies and cost reduction. Further, because dies having a nested structure are not used, an exclusive operator for a molding machine is not necessary.

According to the aforementioned embodiment, the front housing 30, which connects the guide rails 22 arranged at both sides in the width direction of the vehicle, is used for forming the guide grooves 55 and 56, thereby prevent an increase of the number of parts.

According to the aforementioned embodiment, the block 50 and the front housing 30 are fixed to each other with the guide rail 22 sandwiched between the block 50 and the front housing 30. That is, the block 50 is stabilized together with the guide rail 22 and the front housing 30. The block 50 is fixed to the guide rail 22 and the front housing 30, for example, by the use of portions already provided at the guide rail 22 and the front housing 30.

According to the aforementioned embodiment, the block 50 is restricted to move upward by the engagement of the engagement projections 61 with the respective engagement grooves 40a. Thus, the block 50 is prevented from disengaging from the front housing 30 in the height direction. In addition, a portion for fixing the block 50 and the front housing 30 to each other by means of a fastener such as a bolt and a nut is reduced, which leads to a reduction of the number of parts. That is, the block 50 is stabilized by the use of the portions already provided at the guide rail 22 and the front housing 30. An addition of a part for stabilizing the block 50 is therefore not necessary.

According to the aforementioned embodiment, the nuts 44 and 46 are received and embedded in the receiving recess portions 43b and 45b, respectively, formed in the front housing 30 (specifically, support walls 43 and 45) so as to be recessed in the height direction. Thus, the portion where the block 50 and the front housing 30 are fixed to each other is prevented from unnecessarily projecting. Further, the nuts 44 and 46 are prevented from being loosened (i.e., revolving) at the receiving recess portions 43b and 45b to thereby smoothly proceed a tightening process of the bolts 59 and 60.

According to the aforementioned embodiment, the cable guide 47 is provided at the front housing 30 so as to guide the drive cable 32, thereby decreasing the number of parts and the cost.

According to the aforementioned embodiment, as compared to a structure where the functional bracket 24 is sandwiched by block members separately provided at both sides in the width direction of the vehicle for positioning the functional bracket 24 in the width direction, the dimensional accuracy in the width direction is enhanced to thereby reduce the occurrence of looseness and the number of parts. Further, a tightening member for integrating the block members arranged at both sides in the width direction, which is required when the aforementioned structure is adapted, is not necessary.

In a case where the positioning of the functional bracket 24 in the height direction is performed by a movable member, for example, a clearance for allowing the movement of the movable part may be a cause of looseness. Such problem is avoidable according to the present embodiment.

The aforementioned embodiment may be modified as follows. That is, a positional relationship in the height direction between the nuts 44 and 46, and the bolts 59 and 60 may be reversed so that head portions of the bolts 59 and 60 are received and embedded in the receiving recess portions 43b and 45b, respectively. In this case, the respective head portions of the bolts 59 and 60 are desirably prevented from being loosened (i.e., revolved) at the receiving recess portions 43b and 45b.

The block 50 and the front housing 30 between which the guide rail 22 is sandwiched may be fastened by a rivet pin, and the like. In addition, the front end portions of the block 50 and the front housing 30 in the longitudinal direction may be fixed to each other by means of an appropriate fastener instead of the engagement between the engagement grooves 40a and the engagement projections 61.

The guide grooves 55 and 56 may be formed by using an exclusive part instead of the front housing 30. In addition, the side walls 54 constituting a part of the guide grooves 55 and 56 may be formed at the front housing 30.

Either one of the block 50 and the front housing 30 may be molded in a flat shape while the other one of the block 50 and the front housing 30 may be molded into a substantially U-shape in the cross section. Then, the pair of guide grooves 55 and 56 may be obtained by a rectangular cross section defined by the block 50 and the front housing 30 molded in the aforementioned manner.

According to the aforementioned embodiment, the dimensional accuracy in the width direction of the functional part holding structure is desirably secured and a sufficient rigidity thereof is obtained.

One of the front housing 30 and the block 50 functions as a housing extending in the width direction of the vehicle roof 11 and connecting the guide rails 22 provided at both sides in the width direction of the vehicle roof 11.

The front housing 30 and the block 50 are fixed to each other with the guide rail 22 sandwiched between the front housing 30 and the block 50.

The front housing 30 includes the engagement groove 40a of which an upper side is closed and which extends in the longitudinal direction of the vehicle roof 11, and the block 50 includes the engagement projection 61 engaging with the engagement groove 40a and formed to extend in the longitudinal direction of the vehicle roof 11.

The front housing 30 and the block 50 are fixed to each other by means of a threaded portion of the bolt 59 or 60 tightened to the nut 44 or 46, the bolt 59 or 60 penetrating through the front housing 30, the block 50, and the guide rail 22 sandwiched between the front housing 30 and the block 50, and one of the front housing 30 and the block 50 includes the receiving recess portion 43b or 45b recessed in a height direction and in which the threaded portion of the bolt 59 or 60 is received.

The front housing 30 integrally includes the cable guide 47 for guiding the drive cable 32 that transmits a drive force to the second functional bracket 24.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A functional part holding structure adapted to guide a functional part to a guide rail, the functional part being provided at each side of a vehicle roof in a width direction thereof and supporting a movable panel, the functional part holding structure comprising:

a first member including a bottom wall;
a second member including a cover wall;
first and second side walls extending from one of the bottom wall and the cover wall in the width direction toward the other one of the bottom wall and the cover wall, the ends of the first and second side walls making contact with the other one of the bottom wall and the cover wall; and first and second guide grooves formed by the bottom wall, the cover wall, and the first and second side walls and into which guide portions are disposed respectively in a manner where the guide portions are positioned in a width direction and a height direction within the first and second guide grooves, the guide portions being formed at both ends of the functional part in the width direction so as to extend outwardly, the guide portions moving upward and downward along the first and second guide grooves and guided to the guide rail.

2. The functional part holding structure according to claim 1, wherein one of the first member and the second member functions as a housing extending in the width direction of the vehicle roof and connecting the guide rails provided at both sides in the width direction of the vehicle roof.

3. The functional part holding structure according to claim 1, wherein the first member and the second member are fixed to each other with the guide rail sandwiched between the first member and the second member.

4. The functional part holding structure according to claim 1, wherein the first member includes an engagement recess portion of which an upper side is closed and which extends in the longitudinal direction of the vehicle roof, and the second member includes an engagement projection engaging with the engagement recess portion and formed to extend in the longitudinal direction of the vehicle roof.

5. The functional part holding structure according to claim 1, wherein the first member and the second member are fixed to each other by means of a threaded portion of a bolt tightened to a nut, the bolt penetrating through the first member, the second member, and the guide rail sandwiched between the first member and the second member, and one of the first member and the second member includes a receiving recess portion recessed in a height direction and in which the threaded portion of the bolt is received.

6. The functional part holding structure according to claim 1, wherein the first member integrally includes a cable guide for guiding a drive cable that transmits a drive force to the functional part.

* * * * *